United States Patent
King et al.

(10) Patent No.: US 9,263,919 B2
(45) Date of Patent: Feb. 16, 2016

(54) STATOR FOR AN ELECTRICAL MACHINE

(71) Applicant: Dyson Technology Limited, Wiltshire (GB)

(72) Inventors: Gary King, Malmesbury (GB); Nicholas Richard Basil Teden, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 250 days.

(21) Appl. No.: 13/849,183

(22) Filed: Mar. 22, 2013

(65) Prior Publication Data
US 2013/0249330 A1 Sep. 26, 2013

(30) Foreign Application Priority Data
Mar. 23, 2012 (GB) .................................. 1205147.0

(51) Int. Cl.
H02K 1/04 (2006.01)
H02K 1/18 (2006.01)
H02K 1/14 (2006.01)
H02K 21/14 (2006.01)

(52) U.S. Cl.
CPC ............... H02K 1/18 (2013.01); H02K 1/141 (2013.01); H02K 21/14 (2013.01)

(58) Field of Classification Search
CPC .......... H02K 1/18; H02K 21/14; H02K 1/141
USPC ............... 310/43, 49.33–49.37, 49.44–49.45, 310/216.021–216.033
See application file for complete search history.

(56) References Cited

U.S. PATENT DOCUMENTS

| | | | | |
|---|---|---|---|---|
| 4,277,704 A | * | 7/1981 | Giger et al. | 310/49.34 |
| 4,311,934 A | * | 1/1982 | Flaig | 310/216.035 |
| 4,473,766 A | * | 9/1984 | Obergfell et al. | 310/216.036 |
| 5,059,840 A | * | 10/1991 | Plancon | 310/49.23 |
| 5,659,218 A | * | 8/1997 | Kliman et al. | 310/216.028 |
| 2005/0093381 A1 | * | 5/2005 | Ionel et al. | 310/49 R |
| 2007/0132322 A1 | * | 6/2007 | Chiang | 310/49 R |
| 2007/0241629 A1 | | 10/2007 | Ionel et al. | |
| 2011/0043067 A1 | | 2/2011 | Li et al. | |
| 2012/0306297 A1 | | 12/2012 | Kim et al. | |

FOREIGN PATENT DOCUMENTS

| | | |
|---|---|---|
| EP | 1118916 | 7/2001 |
| FR | 2451653 | 10/1980 |
| WO | WO-96/09683 | 3/1996 |

OTHER PUBLICATIONS

International Search Report and Written Opinion mailed Aug. 1, 2013, directed to International Application No. PCT/GB2013/050556; 11 pages.
GB Search Report dated Jun. 28, 2012, directed to GB Application No. 1205147.0; 1 page.

* cited by examiner

*Primary Examiner* — Thanh Lam
(74) *Attorney, Agent, or Firm* — Morrison & Foerster LLP

(57) ABSTRACT

A stator includes a plurality of stator elements, each stator element comprising a c-shaped core having two poles. Each pole of each stator element is secured to a pole of an adjacent stator element by a bridge formed of a non-magnetic material molded onto the poles.

8 Claims, 2 Drawing Sheets

STATOR FOR AN ELECTRICAL MACHINE

REFERENCE TO RELATED APPLICATION

This application claims priority of United Kingdom Application No. 1205147.0 filed Mar. 23, 2012, the entire contents of which are incorporated herein by reference.

FIELD OF THE INVENTION

The present invention relates to a stator for an electrical machine, and to an electrical machine incorporating the same.

BACKGROUND OF THE INVENTION

The stator of a four-pole electrical machine may comprise two c-shaped cores arranged on opposite sides of the rotor. In employing c-shaped cores, a relatively high fill-factor may be achieved for the stator. Additionally, winding the coils onto the cores is generally easier in comparison to that for a single-piece core.

The air gap between the rotor and the stator is ideally as small as possible so as to reduce reluctance. On the other hand, the air gap must be sufficiently large such that, at the tolerance limit, the rotor is free to rotate without contacting the stator. Tolerances in the alignment of the two stator cores generally mean that a larger air gap is required in comparison to a single-piece core.

SUMMARY OF THE INVENTION

In a first aspect, the present invention provides a stator comprising a plurality of stator elements, each stator element comprising a c-shaped core having two poles, each pole of each stator element being secured to a pole of an adjacent stator element by a bridge formed of a non-magnetic material moulded onto the poles.

By employing c-shaped cores, a relatively high fill-factor may be achieved for the stator. Additionally, winding coils onto the cores is made easier. The stator elements may be aligned prior to moulding. The bridges then act to maintain the alignment of the stator elements. Consequently, in spite of employing c-shaped cores, a relatively small air gap may be achieved for the stator. Additionally, well-defined saliencies for the stator poles as well as balanced slot openings may be achieved.

If the bridges were provided as prefabricated components that are secured to the poles, tolerances in the geometry and dimensions of the bridges and the poles may compromise the alignment of the stator elements. By moulding the bridges onto the poles of the stator elements, such tolerances may be absorbed and thus the stator elements may be aligned more precisely.

Since the stator elements are secured together by bridges, a unitary component is achieved for the stator. This then greatly simplifies the assembly of an electrical machine incorporating the stator. For example, the electrical machine may comprise a rotor and a stator secured to a frame. By having a unitary stator, the stator may first be secured to the frame. The rotor may then be secured to the frame and aligned relative to the stator in a subsequent step. Consequently, the stator and the rotor may be secured to the frame in two distinct steps, which may simplify the assembly process. Additionally, the assembly process requires one alignment operation only in order to align the rotor relative to each stator element. In contrast, if the stator elements were provided as distinct elements, it would be necessary to secure and align each of the stator elements and the rotor simultaneously, which would complicate the assembly process.

Each pole may comprise an anchor in the form of a recess or protrusion formed on a surface of the pole. The bridge may then be moulded to the anchors of the poles. As a result, a relatively good securement may be formed between the bridge and each of the poles that it secures.

Each pole may comprise an arcuate pole face, at least part of which is unobscured (i.e. not covered) by the bridge. As a result, a relatively small air gap may be achieved, thereby reducing reluctance.

The core of each stator element may comprise a back and two arms that extend from opposite ends of the back. Each stator element may then comprise a bobbin located on each arm, and a coil wound about each bobbin. A coil may be wound about each arm of the core. This then has the benefit of reducing flux leakage between the arms, thereby reducing the inductance of the stator. Each coil is ideally unobscured (i.e. not covered) by the bridge, since this might other compromise cooling of the coil.

At least one of the bridges may comprise a recess for a sensor. The provision of a recess within the bridge enables the sensor to be accurately positioned within a slot opening of the stator. Where the sensor is a Hall-effect sensor for sensing the position of a permanent-magnet rotor, the sensor may be accurately positioned relative to the stator poles. Consequently, the position of the rotor relative to the stator may be obtained with relatively good accuracy. Where the sensor is a temperature sensor, a relatively good measure of the air temperature at the rotor may be made without risk of the sensor contacting the rotor.

In a second aspect, the present invention provides a stator comprising two stator elements and two bridges, each stator element comprising a c-shaped core having a back and two arms that extend from opposite ends of the back, the free end of each arm defining a pole, and each bridge is formed of a non-magnetic material moulded onto a pole of each stator element.

In a third aspect, the present invention provides an electrical machine comprising a rotor and a stator as claimed in any one of the preceding claims, wherein the stator elements are arranged around the rotor.

The air gap between the rotor and the stator may be asymmetric. By moulding bridges onto the poles of the stator elements, the stator elements may be aligned prior to inclusion within the electrical machine such that the asymmetry in the air gap (i.e. the saliency of the stator poles) causes the rotor to park at a position for which start up is possible. In contrast, if the stator elements were provided as distinct components, it may prove difficult or indeed impossible to align the stator elements within the electrical machine with sufficient accuracy to reliably achieve the asymmetry necessary for rotor start up.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
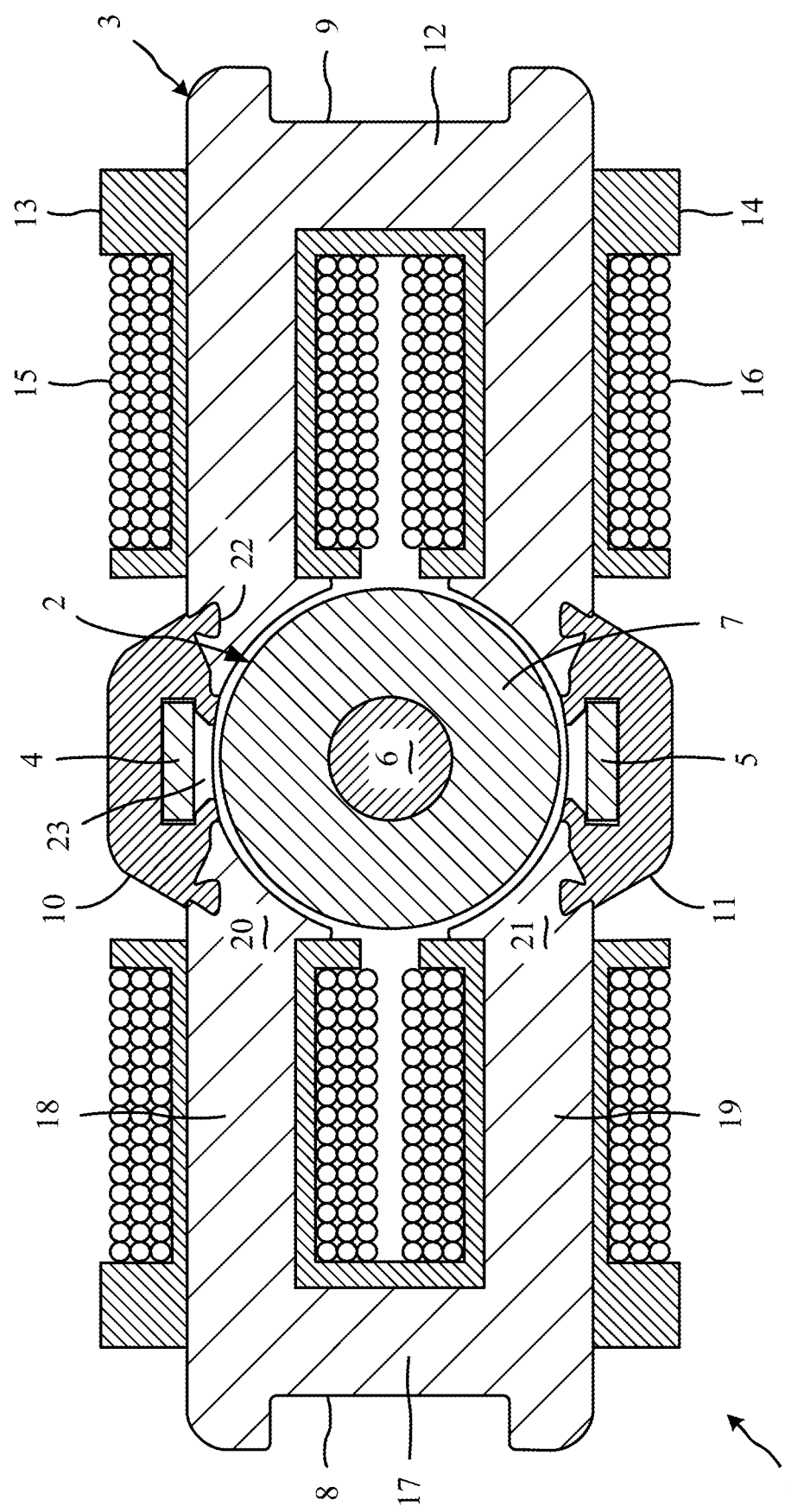
FIG. 1 is a sectional view an electrical machine in accordance with the present invention.

The electrical machine 1 of FIG. 1 comprises a rotor 2, a stator 3, a Hall-effect sensor 4 and a temperature sensor 5.

The rotor 2 comprises a shaft 6 to which a four-pole permanent magnet 7 is secured.

Figure 2:
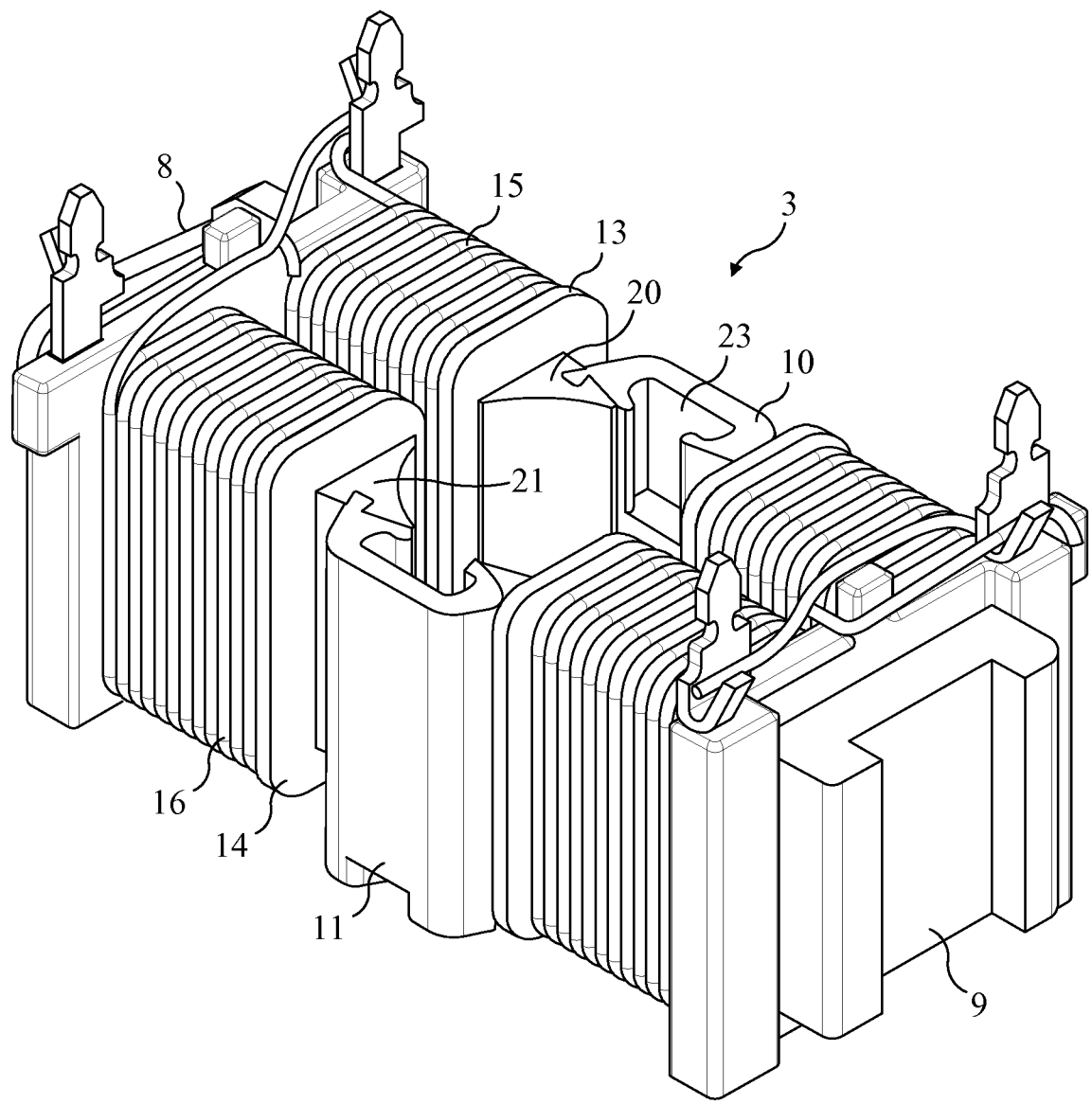
FIG. 2 is a perspective view of the stator of the electrical machine of FIG. 1.

The stator 3, which is additionally illustrated in FIG. 2, comprises two stator elements 8,9 secured together by two bridges 10,11.

Each stator element 8,9 comprises a core 12, a pair of bobbins 13,14, and a pair of coils 15,16.

The core 12 comprises a plurality of laminations of a magnetic material, e.g. electrical steel. The core 12 is c-shaped and comprises a back 17 and two arms 18,19 that extend from opposite ends of the back 17. Each arm 18,19 extends toward the rotor 2 and has a free end that defines a pole 20,21.

Each bobbin 13,14 surrounds a respective arm 18,19 of the core 12, and each coil 15,16 is wound onto a respective bobbin 13,14. A single wire may be used for both coils 15,16 of each stator element 8,9. Alternatively, separate wires may be used for each coil 15,16, which are then coupled together. The coils 15,16 of the two stator elements 8,9 are coupled together to form a single phase winding.

The two stator elements 8,9 are arranged on opposite sides of the rotor 2 and are secured together by the two bridges 10,11. More specifically, a first bridge 10 secures a first pole 20 of a first stator element 8 to a first pole of a second stator element 9, and a second bridge 11 secures a second pole 21 of the first stator element 8 to the second pole of the second stator element 9. Each bridge 10,11 therefore spans a slot opening between the two stator elements 8,9.

Each bridge 10,11 is formed of a non-magnetic material, such as plastic, and is moulded on to each of the two poles 20,21 that it secures. Each pole 20,21 comprises an anchor 22 formed on a surface of the pole 20,21. Each bridge 10,11 is then moulded to the anchors 22 of the two poles 20,21 that it secures. In the embodiment illustrated in the Figures, the anchor 22 takes the form of a recess into which the bridge 10,11 is moulded. Equally, however, the anchor 22 may take the form of a protrusion, over which the bridge 10,11 is moulded. The anchor 22 ensures a good securement is formed between the bridge 10,11 and each of the poles 20,21 that it secures.

Each bridge 10,11 comprises a recess 23 for receiving one of the two sensors 4,5. The Hall-effect sensor 4 is then located in the recess 23 of the first bridge 10, and the temperature sensor 5 is located in the recess 23 of the second bridge 11. The Hall-effect sensor 4 is therefore located in a first slot opening between the two stator elements 8,9, and the temperature sensor 5 is located in a second slot opening between the two stator elements 8,9.

The stator 3 is manufactured by first assembling each stator element 8,9, i.e. moulding or otherwise securing the bobbins 13,14 onto the core 12 and then winding the coils 15,16 onto the bobbins 13,14. The two stator elements 8,9 are then placed into a mould (not shown). The mould includes a number of locating features that act to align the two stator elements 8,9. In particular, the mould includes a central pin against which the pole faces of the stator elements 8,9 abut. Additionally, locating features engage the back 17 of each core 12 such that the stator elements 8,9 are aligned on opposite sides of the central pin. Indeed, as can be seen in the Figures, the back 17 of each core 12 is shaped (e.g. includes a rectangular recess) specifically with the aim of engaging the locating features of the mould. The locating features ensure that the two stator elements 8,9 are accurately aligned within the mould. In particular, the stator elements 8,9 are spaced by a well-defined amount, which in turn results in a well-defined air gap between the rotor 2 and the stator 3. Additionally, a well-defined saliency is achieved for the stator poles 20,21 and the slot openings between the two stator elements 8,9 are balanced (i.e. the angles subtended by the slot openings are the same). After inserting the stator elements 8,9 into the mould, plastic is injected into the mould so as to form the two bridges 10,11. On cooling, the bridges 10,11 act to hold the two stator elements 8,9 together. As a result, a unitary stator 3 is obtained having a well-defined air gap, well-defined saliencies, and balanced slot openings.

The provision of a unitary stator 3 greatly simplifies the assembly of the electrical machine 1. For example, the rotor 2 and the stator 3 are typically secured within a frame (not shown) of the electrical machine 1, e.g. by means of an adhesive. By having a unitary stator 3 in which the stator elements 8,9 are already aligned with respect to one another, the stator 3 may first be secured to the frame. The rotor 2 may then be secured to the frame and aligned relative to the stator 3 in a subsequent step. Consequently, the two components 2,3 may be secured to the frame in two distinct steps, which is likely to simplify the assembly process, particularly when employing an automated process. Additionally, the assembly process requires one alignment operation only in order to align the rotor 2 relative to the two stator elements 8,9. In contrast, if the bridges 10,11 were omitted and the stator elements 8,9 were provided as distinct elements, it would be necessary to align each stator element 8,9 relative to both the rotor 2 and the other stator element 8,9. This would then require all three components 2,8,9 to be secured to the frame and aligned simultaneously, which complicates the assembly process. Moreover, it may be impossible to align and secure all three components 2,8,9 simultaneously. For example, there may be insufficient space for the necessary jigs to locate and align the components 2,8,9.

Moulding the bridges 10,11 onto the cores 12 of the stator elements 8,9 has the advantage of absorbing several tolerances that might otherwise comprise the alignment of the two stator elements 8,9. For example, let us consider an alternative design in which the bridges 10,11 are be provided as prefabricated parts for insertion into the anchors 22 of each pole 20,21. Tolerances in the geometry and dimensions of the bridges 10,11 and the anchors 22 may mean that the bridges 10,11 are oversized relative to the anchors 22 and are thus difficult to insert into the anchors 22, or the bridges 10,11 are undersized relative to the anchors 22 and are thus held loosely within the anchors 22. In both instances, the alignment of the two stator elements 8,9 is likely to be less precise. By moulding the bridges 10,11 onto the cores 12 of the stator elements 8,9, any tolerances in the bridges 10,11 and anchors 22 are absorbed. Consequently, the two stator elements 8,9 may be more precisely aligned.

The air gap between the rotor 2 and at least one of the stator poles 20,21 is asymmetric. As a result, the rotor 2 parks at a position for which the rotor 2 may be started from stationary. The asymmetry in the air gap is relatively small and therefore requires accurate alignment of the two stator elements 8,9. Without accurate alignment, the rotor 2 may park at a position for which start up is not possible. By employing bridges 10,11 to secure the two stator elements 8,9, the stator elements 8,9 may be aligned prior to assembly of the electrical machine 1 so as to ensure that the asymmetry in the air gap (i.e. the saliencies of the stator poles 20,21) is sufficiently well-defined to achieve rotor start up. In contrast, if the stator elements 8,9 were provided as distinct components, it may prove difficult or indeed impossible to align the stator elements 8,9 within the electrical machine 1 with sufficient accuracy to reliably achieve the asymmetry necessary for rotor start up.

Each pole 20,21 has an arcuate pole face adjacent the rotor 2. The bridges 10,11 are moulded onto the poles 20,21 such that the pole faces are largely unobscured (i.e. not covered) by the bridges 10,11. As a result, a relatively small air gap may be achieved between the rotor 2 and the stator 3, thereby reducing reluctance. As explained in the preceding paragraph, the air gap between the rotor 2 and at least one pole 20,21 of the stator 3 is asymmetric. In contrast, the central pin of the mould has a symmetrical cross-section. Consequently, when the stator elements 8,9 are inserted into the mould, a small gap exists between the central pin and an edge of a pole 20,21 having an asymmetric air gap. During injection of the plastic into the mould, plastic penetrates the gap and covers the edge of the pole 20,21. Nevertheless, the size of the air gap between the rotor 2 and the stator poles 20,21 is unaffected. In contrast, if plastic were to completely cover each pole face, a larger gap would be created between the rotor 2 and each stator pole 20,21, thereby increasing the reluctance of the electrical machine 1.

The provision of recesses 23 in the bridges 10,11 enables the sensors 4,5 to be accurately positioned within the slot openings of the stator 3. Accurate positioning of the Hall-effect sensor 4 is critical for ensuring accurate synchronisation of phase excitation with rotor position. Since the bridges 10,11 are moulded onto the poles 20,21 of each stator element 8,9, the recess 23 in the first bridge 10 ensures that the Hall-effect sensor 4 is accurately positioned relative to the stator poles 20,21. Excessive temperatures may lead to premature mechanical failure or demagnetisation of the magnet 7 of the rotor 2. By employing a temperature sensor 5 in the slot opening, a more accurate measure of the temperature at the magnet 7 may be made. Moreover, by locating the sensor 5 in the recess 23 of the second bridge 11, the temperature sensor 5 may be positioned relatively close to the rotor 2 without the risk of the sensor 5 contacting the rotor 2. In contrast, the temperature sensor of a conventional electrical machine is often located on a circuit board located some distance from the magnet. As a result, it may not be possible to obtain a reliable measure of the temperature at the magnet.

The electrical machine 1 described above comprises a stator 3 having two stator elements 8,9. Alternatively, the stator 3 may comprise any number of stator elements 8,9 arranged around the rotor 2. Similarly, the rotor 2 may comprise any number of poles and need not comprise a permanent magnet 7. For example, the electrical machine may be a reluctance machine having stator elements arranged around an iron-core rotor. Irrespective of the number of stator elements, each pole of each stator element is secured to a pole of an adjacent stator element by a bridge moulded onto the poles.

Each stator element 8,9 has a coil 15,16 wound about each arm 18,19 of the core 12. This then has the advantage that the coils 15,16 reduce magnetic flux leakage between the arms 18,19, thereby reducing the inductance of the stator 3. Nevertheless, if required, a single coil may instead be wound onto the back 17 of the core 12. Irrespective of the location of the coil or coils 15,16, the bridges 10,11 are ideally moulded onto the cores 12 in such way that the coils 15,16 are unobscured by the bridges 10,11, since this might other compromise cooling of the coils 15,16.

In the embodiment described above, the bridges 10,11 are moulded as two distinct components. This then has the advantage of minimising the amount of material necessary to form the bridges 10,11. Equally, however, the two bridges 10,11 may be moulded as a single component. For example, the two bridges 10,11 may be linked by one or more runners that extend along the base of the cores 12. This may simply the moulding process and/or provide additional stiffness to the unitary stator 3.

The invention claimed is:

1. A stator comprising a plurality of stator elements, each stator element comprising a c-shaped core having two poles, each pole of each stator element being secured to a pole of an adjacent stator element by a bridge formed of a non-magnetic material moulded onto the poles.

2. The stator as claimed in claim 1, wherein each pole comprises an anchor in the form of a recess or protrusion formed on a surface of the pole, and the bridge is moulded to the anchors of the poles.

3. The stator as claimed in claim 1 or 2, wherein each pole comprises an arcuate pole face and at least part of the pole face is unobscured by the bridge.

4. The stator as claimed in claim 1, wherein the core of each stator element comprises a back and two arms that extend from opposite ends of the back, each stator element comprises a bobbin located on each arm, and a coil wound about each bobbin.

5. The stator as claimed in claim 1, wherein the bridge comprises a recess for receiving a sensor.

6. A stator comprising two stator elements and two bridges, each stator element comprising a c-shaped core having a back and two arms that extend from opposite ends of the back, the free end of each arm defining a pole, and each bridge is formed of a non-magnetic material moulded onto a pole of each stator element.

7. An electrical machine comprising a rotor and a stator as claimed in claim 1 or 6, wherein the stator elements are arranged around the rotor.

8. The electrical machine as claimed in claim 7, wherein an air gap between the rotor and the stator is asymmetric.

\* \* \* \* \*